T. Tripp.
Screw Propeller
N° 26,213.    Patented Nov. 22, 1859.
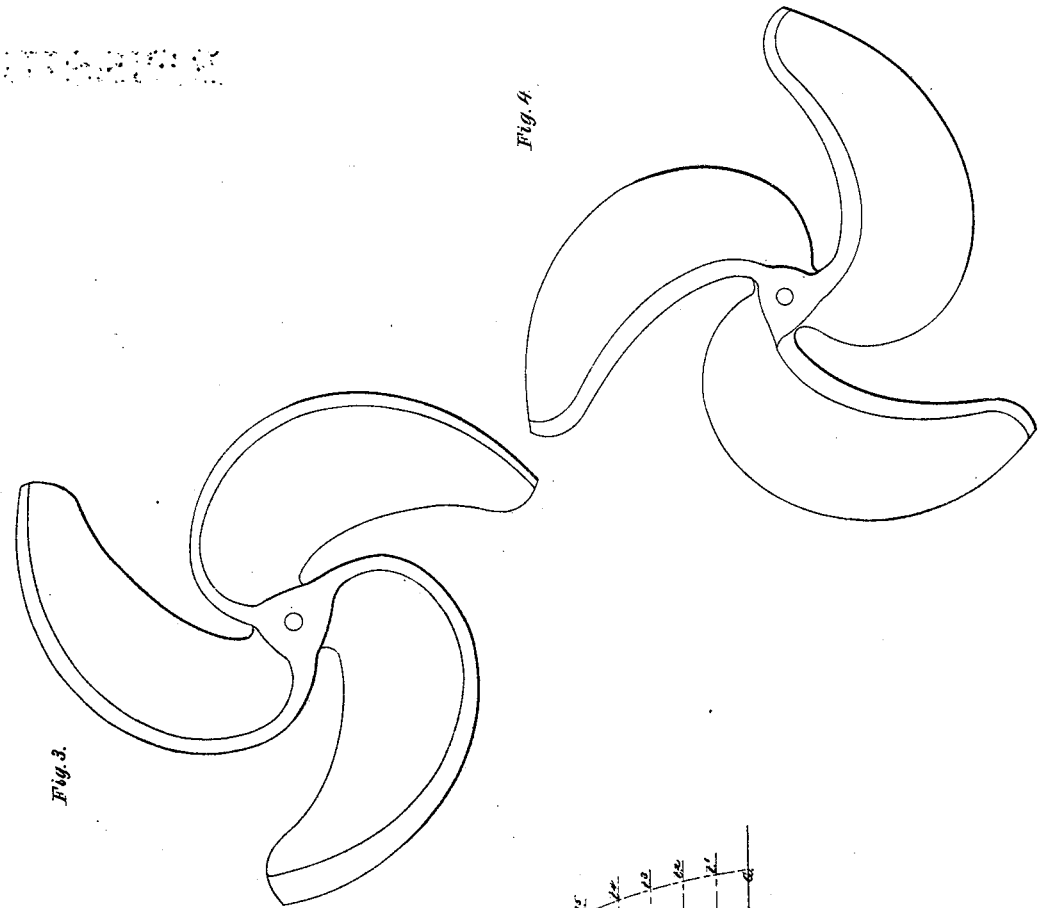
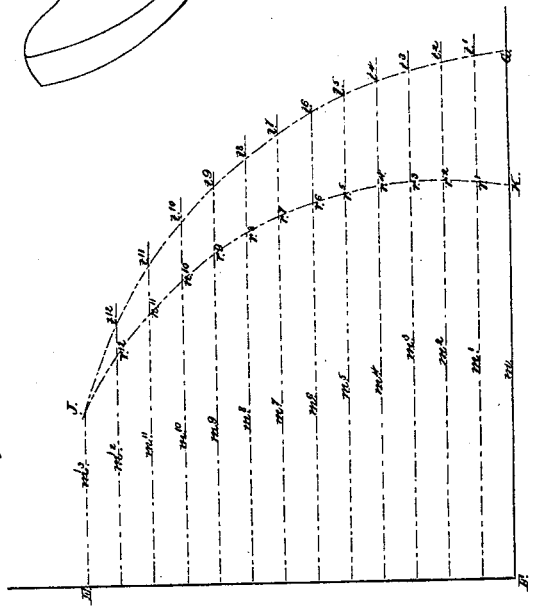
Witnesses.    Inventor.

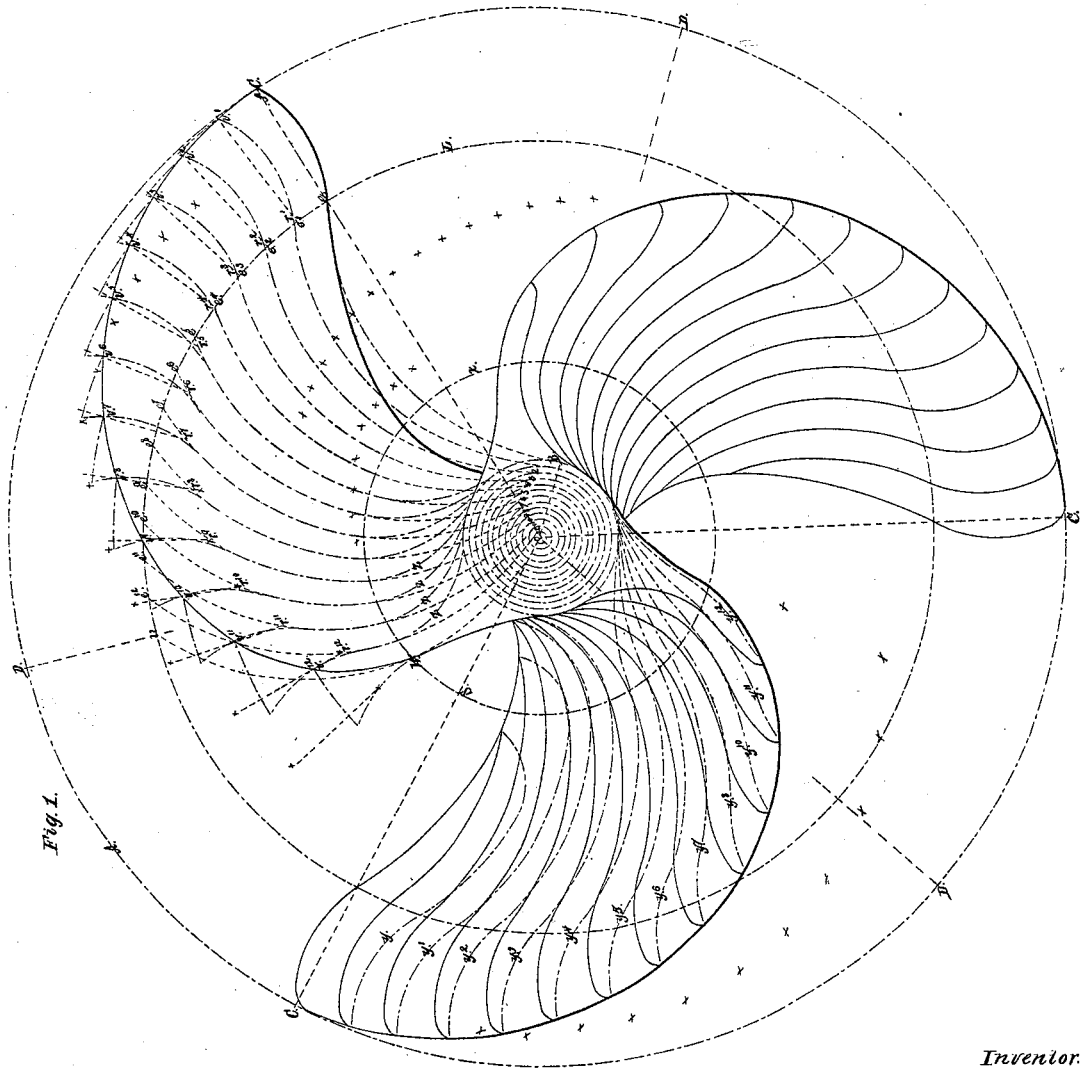

UNITED STATES PATENT OFFICE.

THOMAS TRIPP, OF BUFFALO, NEW YORK.

PROPELLER-WHEEL.

Specification forming part of Letters Patent No. 26,213, dated November 22, 1859; Reissued August 29, 1865, No. 2,061.

*To all whom it may concern:*

Be it known that I, THOMAS TRIPP, of the city of Buffalo, county of Erie, and State of New York, have invented a new and Improved Propeller-Wheel; and I do hereby declare that the following is a full and clear description thereof, reference being had to the accompanying drawings, making a part of this specification, in which—

Figure I is a plan, which represents the wheel as resting upon the ends of its blades upon a horizontal plane. Fig. II is a diagram for the purposes herein set forth. Fig. III front end elevation. Fig. IV rear end elevation.

The form of my improved propeller wheel may be ascertained and a pattern from which the wheel is to be cast may be constructed, by observing the following formula:

1. The diameter of the wheel being given—strike a circle (A) (Fig. 1,) the diameter of which shall equal the proposed diameter of the wheel.

2. The diameter of the hub being given—strike a circle (B), from the center of the wheel, the diameter of which shall equal the proposed diameter of the hub.

3. Determine the length of the chord $(e, f)$ of the commencing arc forming the outward curve or hook of the blade (say 1/4 of the radius of the wheel). And strike a circle (L) from the center of the wheel, the radius of which shall be the radius of the wheel minus the length of this chord.

4. Divide the circle (A) representing the circumference of the wheel into three equal parts (or more according to the number of blades).

5. Through each of the points representing said division, draw radii (C) from the center of the wheel and from the extremities of the radii lay off distances on the circumference of the wheel equal to (1/5) one fifth of the circumference of the wheel and draw radii (D) to those points thus obtained.

6. The radii (C, D,) intercepting an arc $(e, n,)$ of the circle (L) which is divided into thirteen equal parts corresponding to the number of divisions (or layers) into which the pattern for the wheel is divided as "laid up."

7. In diagram (Fig. II,) are shown the lines representing these layers, in which diagram line (E, F) represents the center line of the shaft of the wheel. The distance (E, F) which is equal to the length of the wheel fore and aft is divided into (13) thirteen equal parts, (or a number corresponding to the numbers of layers of material used in laying up the pattern). Through the points thus obtained, draw lines $(m\ m'\ m^2\ m^3,\ \&c.)$ perpendicular to the line (E, F),—these lines will represent the planes formed by the different layers, and it is on these planes that the curved lines forming the outline of the blade will be drawn.

8. The radius of the hub is next divided into (13) thirteen equal parts corresponding to the number of layers. Through each of these points of division, strike circles (1, 2, 3, 4, 5, &c.) from the center of the wheel.

9. With a radius equal to one half (1/2) the radius of the wheel, describe the arc of a circle which shall pass through the point $(e)$ and be tangent to the outer circle of the hub. This arc will lie upon the plane $(m)$ Fig. II. Then with the same radius describe an arc which shall pass through the point $(e')$ and be tangent to the first inner circle (1) of the hub. This arc will lie on the plane $(m')$. With the same radius describe another arc which shall pass through the point $(e^2)$ and the tangent to the 2d inner circle (2) of the hub, and so on until arcs are successively drawn through each of the division points on the arc $(e\ n)$ and tangent successively to each of the circles (1, 2, 3, 4, 5, &c.) of the hub—the last arc passing through the point $(n)$ and terminating at the center $(o)$ of the wheel. These arcs will describe the main curved surface of the blade and will lie successively upon the planes $m\ m'\ m^2\ m^3$, &c., Fig. II.

10. Describe a circle $(x)$ from the center of the wheel with a radius one third the radius of the wheel—such portions of the arcs last above described as fall within this circle are not used nor formed upon the surface of the wheel—but arcs $(z, z, z,)$ of a less radius which shall be tangent to them at their points of intersection with the circle $(x)$ and also tangent to the outer circle of the hub are substituted for them.

11. In order to develop the outward curve of outward arcs of the blade, a series of points must now be formed which will lie successively on the arcs $(1, e', 2, e^2, 3, e^3, 4, e^4, \&c.)$ and gradually draw toward the point ($w$) of intersection of the last described arc ($n$—$o$) with the circle ($x$). To accomplish this; suppose the line ($m'$ $m^2$, &c.) Fig. II, represent radii of indefinite length lying in the same perpendicular plane. On the indefinite radii ($m$) lay off a distance F, K, equal to the length of the radii ($o$—$e$) and on the indefinite radii ($m^{13}$) a distance (E—J) equal to the radii ($o$, $s$). Through the points thus obtained describe the arc (J, K) cutting the radii ($m$ $m'$ $m''$, &c.) in the points ($p'$ $p^2$ $p^3$, &c.). Now, if the radii thus obtained be transferred to the plane (Fig. I) and successively moved on their common center ($o$) until they successively intersect the arcs (1 $e'$, 2 $e^2$, &c.) such points of intersection will be the points required. For instance if the radii ($m^9$) be turned on its center until it intersects the arc of $e^9$ at $r^9$ such point of intersection will be one of the points required the others ($r^1$ $r^2$ $r^3$ $r^4$, &c.) being found in the same manner.

12. Through these points ($r^1$ $r^2$ $r^3$, &c.) draw radii and prolong them indefinitely beyond these points.

13. It is now necessary to find a series of points lying successively on these radii last mentioned which shall, starting from ($e$) sweep toward the point ($w$). These points are found in a similar manner to the points, $r$. As before, suppose the lines ($m^2$ $m'$, &c.) to represent radii of indefinite length in the same perpendicular plane. The same distance (E—J) on radii ($m^{13}$) as before, being laid off and a distance (G) equal to the radii ($o$ $c$) of the wheel being laid off on radii ($m$) an arc (J G) is drawn through the points thus obtained cutting the radii in the points ($t'$, $t^2$, &c.). The definite radii thus obtained are transferred to the plan and turned successively on their common center ($o$) until they successively coincide with the successive radii upon which the desired points are to lie, their extremities marking the required points. For instance suppose the radii ($m^9$) to be turned until it shall coincide with the radii passing through the point ($r^9$). Its length being measured off on said radii, will give one of the desired points ($v^9$). The others are obtained in the same manner. The entering edge of the blade is a line (C W) passing through these points.

14. The arcs which form the outward curve or hook also pass through these points. They are drawn with a radii equal to (1/4) one fourth the radii of the wheel and with such centers that they will pass through the points ($v'$ $v^2$, &c.) and be tangent to the principal arcs (1, $e'$, 2, $e^2$, &c.).

The lines ($y$, $y'$, $y^2$, &c.) represent the propelling surface of the blade and are formed by arcs whose radii are equal to those forming the inward surface of the blade, their center being moved the thickness of the blade.

This rule of construction will apply to a wheel of any required diameter and of any required "lead" and of any required number of blades.

In stating my formula thus minutely I do not intend to confine myself to the precise lines or form described but include all such variations thereof as are essentially embraced within the principles of my improvements.

A propeller wheel constructed according to the principles of my improvement possess the following distinguishing characteristics: 1st, the main inward surface of the blades upon both faces thereof describe arcs with a radius one half the length of the radius of the wheel; 2d, the outward curve or hook of the blade upon both faces thereof describe arcs with a radius (1/4) one fourth the radius of the wheel and with gradually diminishing chords; 3, in action the blades "push" against the water in a manner to give the water moved by the blades, a spiral motion, without breaking the volume of water moved,—consequently the moment the blade has exerted its propelling power it leaves the water, as first moved, and does not therefore lift or carry water, and is nearly or quite free from "slip."

I claim—

A propeller wheel having blades formed in respect to their main propelling surfaces and also in respect to their outward arcs substantially as herein described.

THOMAS TRIPP.

Witnesses:
R. E. CAMPBELL,
E. B. FORBUSH.